US006559423B2

(12) United States Patent
Nguyen et al.

(10) Patent No.: US 6,559,423 B2
(45) Date of Patent: May 6, 2003

(54) TOASTER CHASSIS ASSEMBLY WITH IMPROVED FOOD SUPPORT AND SAFETY MECHANISM

(75) Inventors: Nhiem Viet Nguyen, Glen Allen, VA (US); John J. Datovech, Ashland, VA (US); James Gaynor, Richmond, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 10/080,796

(22) Filed: Feb. 22, 2002

(65) Prior Publication Data

US 2002/0113053 A1 Aug. 22, 2002

Related U.S. Application Data

(60) Provisional application No. 60/270,786, filed on Feb. 22, 2001.

(51) Int. Cl.[7] ................................................. A47J 37/08
(52) U.S. Cl. ........................ 219/386; 219/392; 99/332; 99/338
(58) Field of Search ................................. 219/386, 392, 219/412–414, 491, 493, 509; 99/326–328, 329 R, 385, 391, 393

(56) References Cited

U.S. PATENT DOCUMENTS

| | | | |
|---|---|---|---|
| 2,491,829 A | 12/1949 | Palmer et al. | |
| 2,877,702 A | 3/1959 | Turner | |
| 3,361,053 A | 1/1968 | Jepson et al. | |
| 3,869,970 A | * 3/1975 | Eagle | ........................ 99/329 R |
| 3,915,309 A | 10/1975 | Brazdo | |
| 4,216,372 A | 8/1980 | Huggler | |
| 4,972,768 A | 11/1990 | Basora San Juan | |
| 5,121,678 A | 6/1992 | Del Fresno | |
| 5,385,082 A | * 1/1995 | Huggler et al. | ............. 219/492 |
| 5,642,657 A | 7/1997 | Yeung et al. | |
| 5,664,481 A | * 9/1997 | Huggler | ........................ 99/328 |
| 5,664,483 A | 9/1997 | Yip | |
| 6,104,001 A | 8/2000 | Huggler | |
| 6,112,648 A | 9/2000 | Origane | |
| 6,350,970 B1 | * 2/2002 | Huggler | ...................... 219/514 |

* cited by examiner

Primary Examiner—Joseph Pelham
(74) Attorney, Agent, or Firm—Akin Gump Strauss Hauer & Feld, L.L.P.

(57) ABSTRACT

An electric toaster includes a chassis with one or more toasting compartments. At least one electric heater is located in each compartment, and a cage is positioned in each compartment adjacent the heater. The cage includes lateral sides with a gap therebetween for receiving a food item and stationary supports that extend into the gap from the lateral sides for supporting the food item during a toasting operation. The electric toaster also includes a movable food support rod that is positioned in the toasting compartment for movement between an upper rest position and a lower toasting position below the stationary supports. The movable food support rod is adapted to support the food item above the stationary support and to transfer support of the food item to the stationary support when the movable food support rod travels below the stationary supports. A switch is positioned for activation by downward movement of the movable support from the stationary supports toward the lower toasting position to energize the electric heater. The switch is deactivated upon upward movement of the movable support from the lower toasting position toward the stationary supports to deenergize the at least one electric heater before reengagement of the movable support with the food item. In this manner, operation of the toaster can be stopped at the end of a toasting cycle independently of the presence or absence of a food jam.

18 Claims, 5 Drawing Sheets

TOASTER CHASSIS ASSEMBLY WITH IMPROVED FOOD SUPPORT AND SAFETY MECHANISM

CROSS-REFERENCE TO RELATED APPLICATIONS

This application claims the benefit of U.S. Provisional Application No. 60/270,786 filed on Feb. 22, 2001, the disclosure of which is hereby incorporated by reference.

BACKGROUND OF THE INVENTION

This invention relates to electric toasters, and more particularly to an electric toaster with an improved food support and safety mechanism for arresting operation of the toaster in the event of a jammed food item.

Household toasters commonly have a control chamber separated from a toasting chamber by a vertical end wall. A bread carriage plate is slidably received on a support post in the control chamber and carries a pair of bread lifters that extend into and at least partially through the toasting chamber between heating elements located in the toasting chamber. The carriage plate, and accordingly the bread lifters, are vertically movable between a raised position for permitting the bread or other food items to be placed on or removed from the bread lifters and a lowered position for holding the bread or other food items in a toasting position.

Some toasters have only one bread lifter and some have more than two bread lifters. For ease of discussion, this invention is disclosed for use in a toaster configuration which has two bread lifters, such presently being the most common configuration. However, as will become apparent, aspects of this invention described below can be used in other toaster configurations.

In many toasters, the bread lifters are connected to a vertically movable support carriage. A coil spring biases the support carriage upwardly so that the bread lifters are normally in an upper, non-toasting position. The support carriage can be lowered to the toasting position by manipulation of a control lever accessible from outside the toaster housing. During a toasting cycle, a latch mechanism holds the support carriage and thus the bread lifters in a lowered, toasting position. User-adjustable electric means controls the duration of the toasting cycle during which the bread lifters are latched in the toasting position in order to toast the food items to a desired color.

Some toasters include a lost-motion safety device wherein the bread is lowered by the support carriage onto holding tabs that extend from a sheet metal base of the toaster. The tabs are formed by stamping U-shaped slots in the sheet metal base then bending the tabs to form cantilevered supports. Once the bread is supported on the holding tabs, the support carriage can continue to descend until locked or latched in a toasting position, whereupon heating elements are energized to toast the bread. Should the bread become lodged at the end of a heating cycle, the support carriage will move upward to de-energize the heating elements before it contacts the bread. In this manner, the toasting cycle is stopped before the bread reaches an unpleasant state, and any danger associated with manually removing the bread from the toaster is minimized.

The prior art method of forming the holding tabs in the base of the toaster for the lost-motion safety device is a time-consuming task that requires special machinery and/or extra processing steps, resulting in a higher cost per toaster unit. In order to maintain a competitive edge in the toaster industry, there is a continuous need to improve toaster mechanisms and their method of manufacture to realize further cost savings while maintaining safety standards. Accordingly, it would be advantageous to provide holding tabs or the like in a lost-motion safety device for a toaster that reduces manufacturing costs.

BRIEF SUMMARY OF THE INVENTION

According to one aspect of the invention, an electric toaster comprises a chassis having at least one toasting compartment. At least one electric heater is located in the compartment, and a cage is positioned in the compartment adjacent the heater. The cage includes lateral sides with a gap therebetween for receiving a food item and stationary supports extending into the gap from the lateral sides for supporting the food item during a toasting operation. The electric toaster also includes a movable support that is positioned in the toasting compartment for movement between an upper rest position and a lower toasting position below the stationary supports. The movable support is adapted to support the food item above the stationary support and to transfer support of the food item to the stationary support when the movable support travels below the stationary supports. At least one switch is positioned for activation by downward movement of the movable support from the stationary supports toward the lower toasting position to energize the at least one electric heater. The at least one switch is deactivated upon upward movement of the movable support from the lower toasting position toward the stationary supports to deenergize the at least one electric heater before reengagement of the movable support with the food item.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

The invention will now be described in greater detail with reference to the drawings, wherein like parts throughout the drawing figures are represented by like numerals.

DETAILED DESCRIPTION OF THE INVENTION

Figure 1:
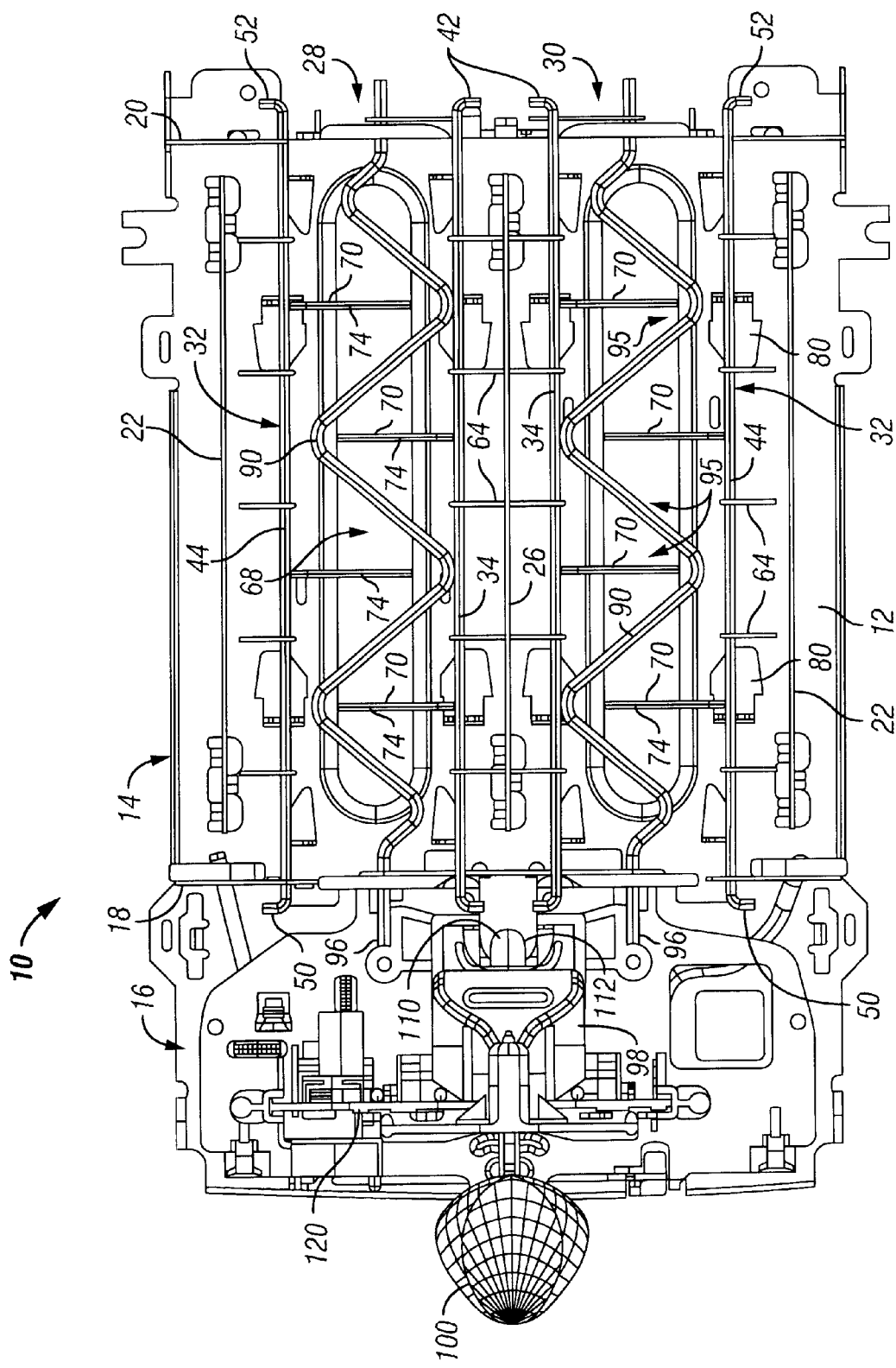
FIG. 1 is a top plan view of a toaster chassis assembly with two toasting compartments according to the present invention.
Figure 2:
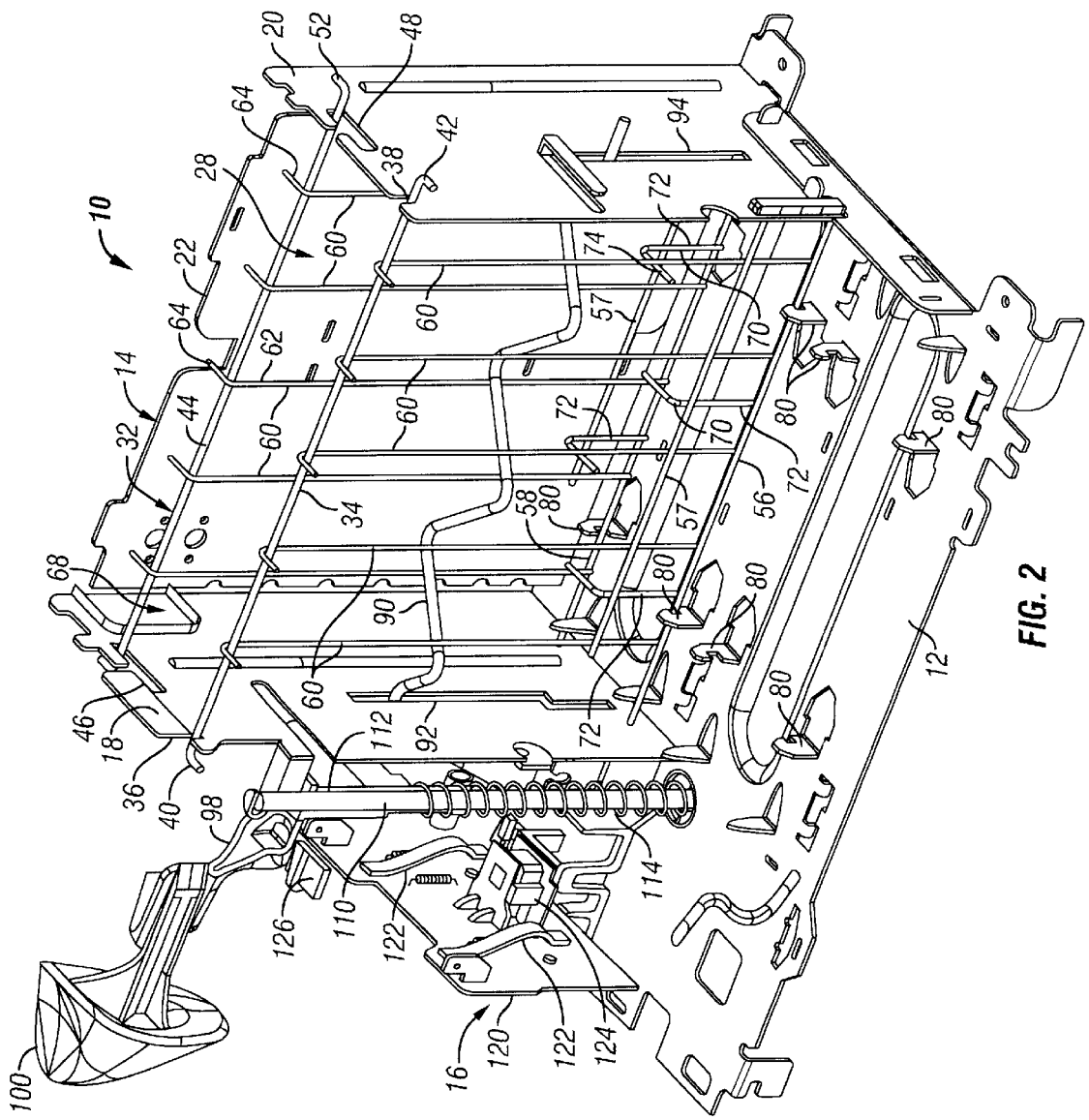
FIG. 2 is a perspective view, in partial cross section, of the toaster chassis assembly of FIG. 1 with one of the toasting compartments removed for clarity.
Figure 3:
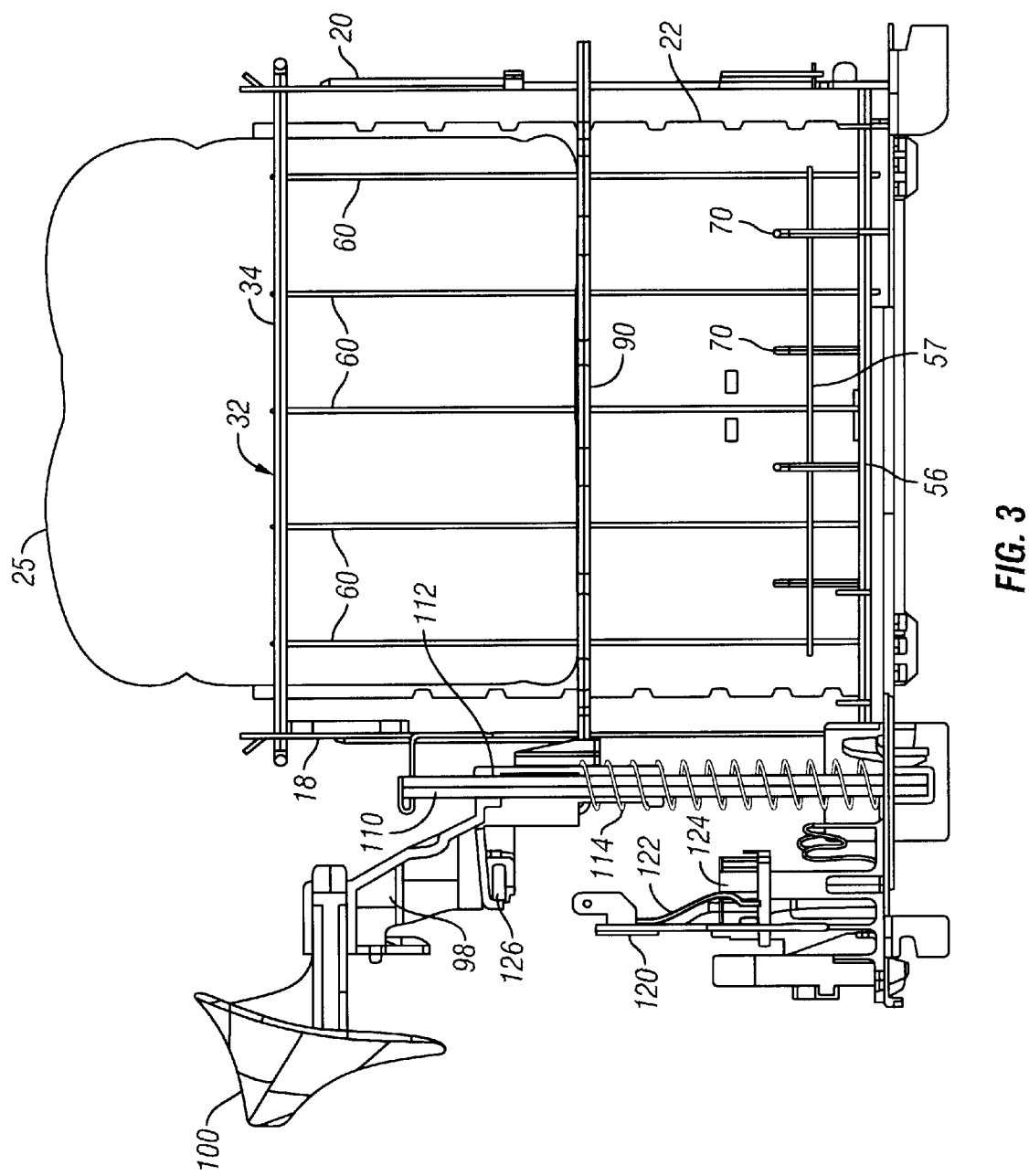
FIG. 3 is a side elevational view of the toaster chassis assembly in a rest or non-operational position.

Referring now to the drawings, and to FIGS. 1 to 3 in particular, a toaster chassis assembly 10 is illustrated. The chassis assembly 10 includes a base 12 with a toasting section 14 and a control section 16 for operating the toasting section.

The toasting section 14 has a pair of end walls 18 and 20 that are connected to the base 12 and extend upwardly therefrom. The end wall 18 divides the toasting section 14 from the control section 16. Side heating element cards 22 extend between the end walls 18 and 20. A center heating element card 26 is located between the cards 22 and also extends between the end walls 18 and 20. The heating element cards together with the end walls form a pair of toasting compartments 28 and 30. The heating element cards 22, 26 include heating elements (not shown) of well-known construction and therefore will not be further described.

Each toasting compartment 28, 30 has a wire cage assembly 32 for holding a food item 25 (FIG. 3), such as a slice of bread or pastry item. The wire cage 32 includes an upper center rod 34 that is received within open slots 36 and 38 of the end walls 18 and 20, respectively. The ends 40 and 42 of the rod 34 are bent to prevent excessive forward and rearward movement of the wire cage 32. An upper side rod 44 extends through closed slots 46 and 48 of the ends walls 18 and 20, respectively. The ends 50 and 52 of the rod 44 are bent to prevent excessive forward and rearward movement of the wire cage 32, yet permit lateral displacement of the rod 44 within the slots 46 and 48. A lower center rod 56 is positioned below the upper center rod 34 and extends generally horizontally between the end plates 18 and 20. Likewise, a lower side rod 58 is positioned below the upper side rod 44 and extends between the end plates 18 and 20. Preferably, the lower side rod 58 is pivotally mounted to the base 12. A plurality of L-shaped rods 60 include a first leg 62 that extends generally vertically between either the upper and lower middle rods or the upper and lower side rods, and a second leg 64 that extends over one of the upper middle and side rods, generally transverse to the first leg 62. The rods 60 are preferably welded to the upper and lower middle and side rods to form the lateral sides of the cage. A reinforcing rod 57 extends substantially parallel to the lower middle and side rods and is preferably welded to the first legs 62 of the L-shaped rods 60. A gap 68 is formed between the lateral sides for receiving bread or other food items to be toasted.

Stationary food supports 70 are provided for holding bread or other food items during a toasting operation. Each food support 70 is preferably L-shaped in configuration with a mounting finger 72 that is attached to either lower middle rod or the lower side rod and a support finger 74 that extends generally transverse to the mounting finger and into the gap 68. Preferably, the mounting fingers are welded to the lower middle and side rods and the reinforcing rod 57. The supports 70 are preferably staggered along the lower middle and side rods. The cage assembly 32 in this manner can receive and support bread or other food items while keeping them a safe distance away from the heating element cards 22 and 26. It has been found that welding the supports 70 to the cage assembly 32 reduces manufacturing costs and provides an integral unit that is easier to assemble than prior art arrangements. The support fingers 74 are preferably cylindrical in shape to minimize their contact area with the food items. In this manner, the support fingers will tend to remain clean since crumbs and other particles will not normally accumulate on the surface of the support fingers.

Each cage assembly 32 is mounted to the base 12, preferably through hook-shaped tabs 80 that are formed in the base 12 and bent to a generally vertical orientation. The hook-shaped tabs 80 grasp the lower middle and side rods 56 and 58, respectively, to hold the cage assembly 32 to the base 12.

Figure 4:
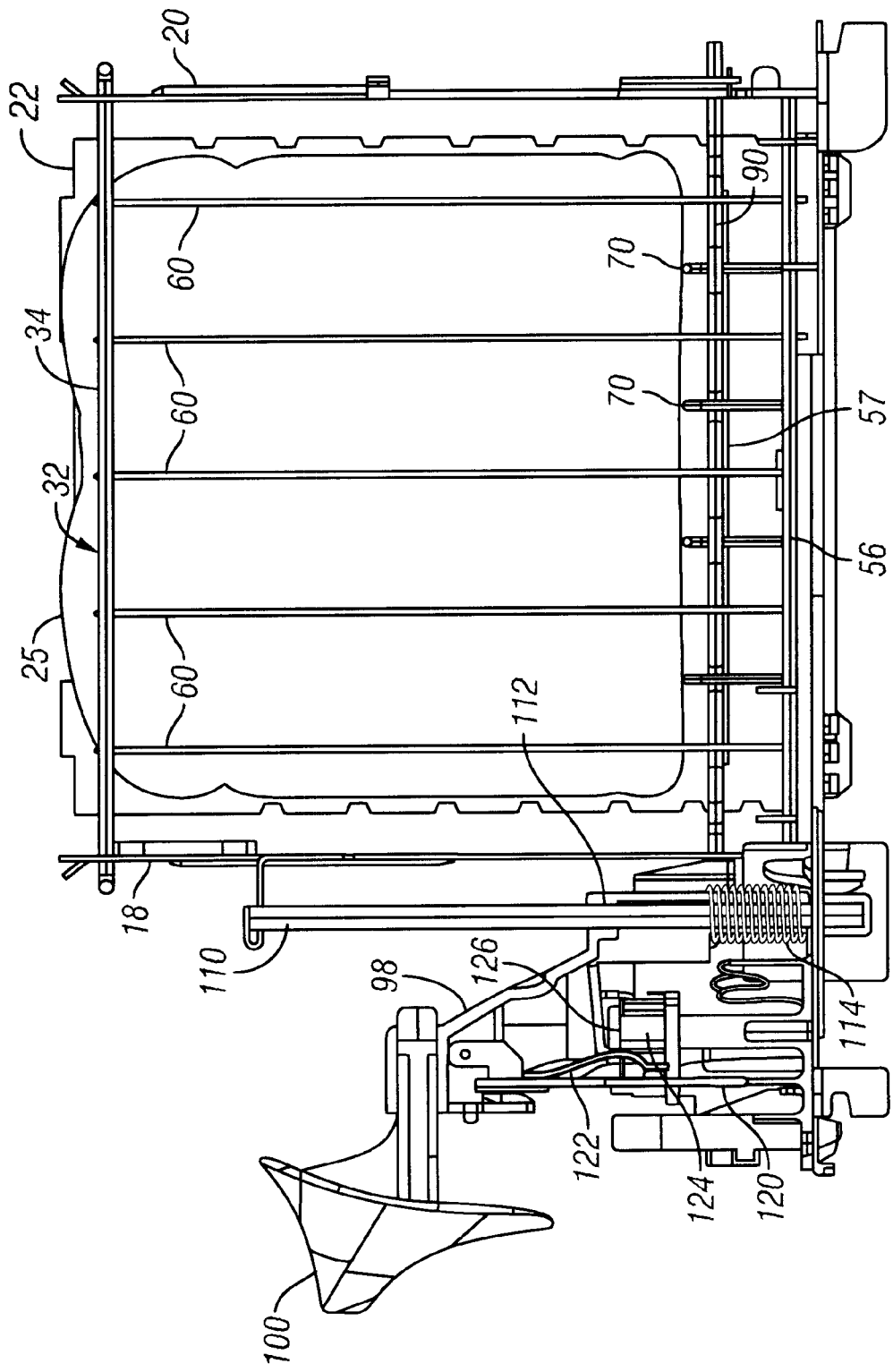
FIG. 4 is a side elevational view of the toaster chassis assembly in an operational position.

A carriage rod 90 extends through a generally vertically oriented slot 92 in the end wall 18 and a corresponding generally vertically oriented slot 94 in the end wall 20. A forward end 96 of the carriage rod 90 is connected to a carriage bracket 98 that is in turn connected to a user-manipulated operating knob 100 for sliding the carriage rod 90 between an upper rest position (FIG. 3) and a lower-most position (FIG. 4). As shown in FIG. 1, the carriage rod 90 is preferably accordion-shaped to both support bread or other food items thereon and provide spaces 95 that clear the food supports 70 when the carriage rod 90 is moved downward to its lower-most position below the support fingers 74.

With additional reference to FIGS. 3 and 4, the control section 16 includes a guide rod 110 that is mounted to the base 12 and extends upwardly therefrom. The carriage bracket 98 includes an opening 112 that slidably receives the guide rod 110. A compression spring 114 is installed on the guide rod 110 and extends between the base 12 and the carriage bracket 98. The spring 114 normally biases the carriage rods 90 to their upper rest position.

A printed circuit board 120 also forms part of the control section 16 and is mounted to the base 12 in a generally vertical orientation. The circuit board 120 includes a pair of contact switches 122 and an electromagnet 124 that is energized when the switches 122 are forced closed by the carriage bracket 98 during a toasting operation. An armature 126 is mounted on the carriage bracket 98 and is held by the energized electromagnet to thereby hold the carriage rods 90 in their lower-most position during the toasting operation. Although not shown, well-known means for de-energizing the electromagnet and completing the toasting operation may be provided in conjunction with a manually settable knob for adjusting the toasted color of the bread or other food item.

In operation, and by way of example, a food item 25, such as a slice of bread, is inserted into one or more of the compartments 28 and 30 so as to rest on one of the carriage rods 90. The operating knob 100 is then pressed downwardly to lower the carriage rod 90 until the lower edge of the bread 25 engages the support fingers 74 of the support rods 70, arresting its movement. In this position, the bread 25 faces the heating elements which are not yet energized, since the contact switches 122 have not been closed by the carriage bracket 98. Continued downward movement of the carriage rod 90 to its lower-most position, as shown in FIG. 4, causes the carriage bracket to engage and close the contact switches 122, to thereby energize the heating elements associated with the heating cards, as well as the electromagnet 124. In this condition, the armature 126 is engaged and held by the energized electromagnet 124 to thereby hold the carriage rod 90 in its lower-most position, which is below the level of the support fingers 74 and the lower edge of the bread. After a preset time period, which may be previously set by a user, power to the electromagnet is cut and the carriage rod 90 is lifted upward under bias from the spring 114 to engage and lift the bread 25 to the upper rest position, as shown in FIG. 3 so that the bread can be taken from the compartments. Power to the heating elements is also cut off when the contact switches 122 are opened due to upward movement of the carriage bracket 98 away from the contact switches under bias force from the spring 114.

Figure 5:
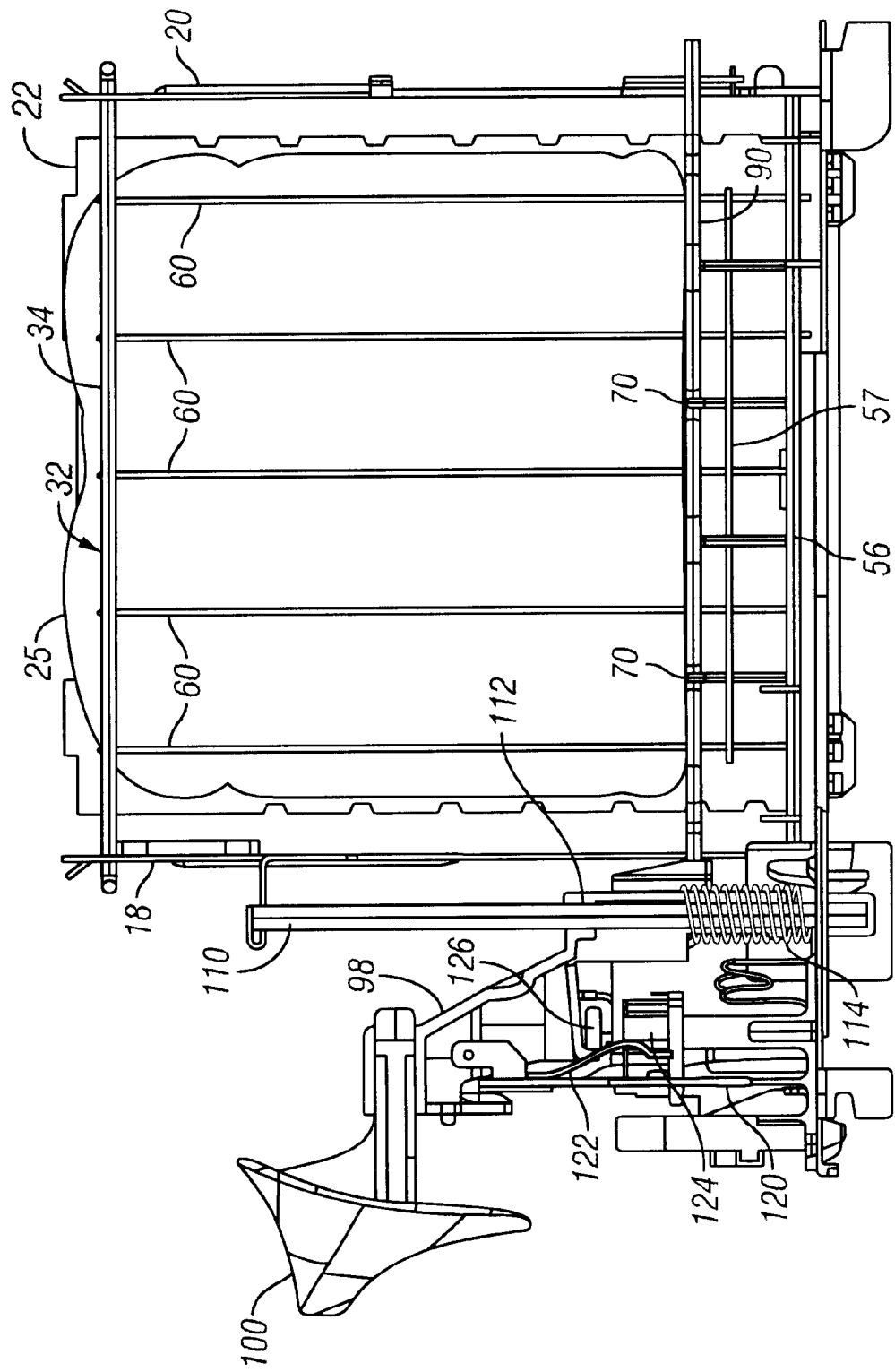
FIG. 5 is a side elevational view of the toaster chassis assembly in a safety shut-off position.

When a food item is jammed in one or both of the compartments, as shown in FIG. 5, the carriage rod 90 is prevented from returning to its upper rest position. However, the distance between the lower-most position of the carriage rod 90 and the support fingers 74 is sufficient to release the contact switches 122 before the carriage rod engages the bread 25 or other food item to thereby turn off the heating elements and prevent burning of the food item.

It will be appreciated by those skilled in the art that changes could be made to the embodiments described above without departing from the broad inventive concept thereof. It will be understood, therefore, that this invention is not limited to the particular embodiments disclosed, but it is intended to cover modifications within the spirit and scope of the present invention as defined by the appended claims.

We claim:

1. An electric toaster comprising:
    a chassis having at least one toasting compartment;
    at least one electric heater located in the toasting compartment;
    a wire cage positioned in the toasting compartment adjacent the heater, the wire cage including lateral sides with a gap therebetween for receiving a food item, each of the lateral J sides having spaced rods to thereby form the gap and stationary supports extending into the gap from at least one of the spaced rods for supporting the food item during a toasting operation;
    a movable support positioned in the toasting compartment for movement between an upper rest position and a lower toasting position below the stationary supports, the movable support being adapted to support the food item above the stationary support and to transfer support of the food item to the stationary support when the movable support travels below the stationary supports; and
    at least one switch positioned for activation by downward movement of the movable support from the stationary supports toward the lower toasting position to energize the at least one electric heater, the at least one switch being deactivated upon upward movement of the movable support from the lower toasting position toward the stationary supports to deenergize the at least one electric heater before reengagement of the movable support with the food item.

2. An electric toaster in accordance with claim 1, wherein the spaced rods comprise spaced lower rods.

3. An electric toaster in accordance with claim 2, wherein each stationary support is L-shaped in configuration with a mounting finger attached to one of the lower rods and a support finger extending into the gap from the mounting finger.

4. An electric toaster in accordance with claim 3, wherein the mounting fingers are welded to the lower rods.

5. An electric toaster in accordance with claim 3, wherein the stationary supports are staggered along the lower rods.

6. An electric toaster in accordance with claim 5, wherein the movable support is accordion-shaped in configuration to thereby clear the support fingers when the movable support travels past the stationary supports.

7. An electric toaster in accordance with claim 1, wherein the movable support is accordion-shaped in configuration to thereby clear the stationary supports when the movable support travels past the stationary supports.

8. An electric toaster in accordance with claim 1, wherein the spaced rods of each lateral side of the cage comprises a first pair of upper and lower rods and a second pair of upper and lower rods spaced from the first pair and a plurality of transverse rods extending between the upper and lower rods of each pair to thereby form the gap, and further wherein the stationary supports are connected to each of the lower rods.

9. An electric toaster in accordance with claim 8, wherein each stationary support is L-shaped in configuration with a mounting finger attached to one of the lower rods and a support finger extending into the gap from the mounting finger.

10. An electric toaster comprising:
    a chassis having at least one toasting compartment;
    at least one electric heater located in the toasting compartment;
    a cage positioned in the toasting compartment adjacent the heater, the cage including lateral sides with a gap therebetween for receiving a food item and stationary supports extending into the gap from the lateral sides for supporting the food item during a toasting operation, each lateral side of the cage comprising a first pair of upper and lower rods and a second pair of upper and lower rods spaced from the first pair and a plurality of transverse rods extending between the upper and lower rods of each pair to thereby form the gap, each stationary support being L-shaped in configuration with a mounting finger attached to one of the lower rods and a support finger extending into the gap from the mounting finger;
    a movable support positioned in the toasting compartment for movement between an upper rest position and a lower toasting position below the stationary supports, the movable support being adapted to support the food item above the stationary support and to transfer support of the food item to the stationary supports when the movable support travels below the stationary supports; and
    at least one switch positioned for activation by downward movement of the movable support from the stationary supports toward the lower toasting position to energize the at least one electric heater, the at least one switch being deactivated upon upward movement of the movable support from the lower toasting position toward the stationary supports to deenergize the at least one electric heater before reengagement of the movable support with the food item, wherein the lateral sides of the cage further comprise reinforcing rods positioned adjacent the lower rods, and further wherein each of the mounting fingers is additionally attached to one of the reinforcing rods.

11. An electric toaster in accordance with claim 10, wherein the mounting fingers are welded to the lower rods and the reinforcing rods.

12. An electric toaster in accordance with claim 10, wherein the stationary supports of one lateral side are offset from the stationary supports of the other lateral side.

13. An electric toaster in accordance with claim 12, wherein the movable support is accordion-shaped in configuration to thereby clear the offset support fingers when the movable support travels past the stationary supports.

14. An electric toaster in accordance with claim 1, wherein the movable support is biased toward the upper rest position.

15. An electric toaster in accordance with claim 1, and further comprising a carriage bracket connected to the movable support for movement therewith, the carriage bracket being configured for activating the at least one switch upon downward movement of the movable support toward the lower toasting position.

16. An electric toaster in accordance with claim 15, and further comprising an operating knob connected to the carriage bracket for manually moving the movable support toward the lower toasting position.

17. An electric toaster in accordance with claim 16, wherein the movable support is biased toward the upper rest position.

18. An electric toaster in accordance with claim 15, and further comprising:
    an electromagnet fixed against movement with respect to the chassis and electrically connected to the at least one switch; and
    an armature connected to the carriage bracket for movement therewith, the armature being adapted to contact the electromagnet;
    wherein activation of the at least one switch energizes the electromagnet for a predetermined time period to hold the armature, and thus the movable support, in the lower toasting position for the predetermined time period.

* * * * *